United States Patent [19]

Pollard et al.

[11] 4,362,978

[45] Dec. 7, 1982

[54] CONTROL SYSTEM FOR MANIPULATOR APPARATUS

[75] Inventors: Brian W. Pollard, Westport; William Perzley, Weston; Stanley J. Blanchard, Danbury, all of Conn.

[73] Assignee: Unimation, Inc., Danbury, Conn.

[21] Appl. No.: 201,181

[22] Filed: Oct. 27, 1980

[51] Int. Cl.³ ............................................ G05B 19/42
[52] U.S. Cl. .................................. 318/568; 318/632; 318/648
[58] Field of Search ........................ 318/568, 648, 632

[56] References Cited

U.S. PATENT DOCUMENTS

| 154,439 | 2/1889 | Perzley et al. | 246/469 |
|---|---|---|---|
| 3,661,051 | 5/1972 | Dunne et al. | 91/35 |
| 4,086,522 | 4/1978 | Engelberger et al. | 318/568 |
| 4,132,937 | 1/1979 | Engelberger et al. | 318/568 |
| 4,156,835 | 5/1979 | Whitney et al. | 318/648 |
| 4,243,923 | 1/1981 | Whitney et al. | 318/648 |

*Primary Examiner*—B. Dobeck
*Attorney, Agent, or Firm*—Mason, Kolehmainen, Rathburn & Wyss

[57] ABSTRACT

A control system is provided for a programmable manipulator having an arm movable in a plurality of axes that results in improved dynamic performance and control of a manipulator arm over a wide range of arm loads, dynamic operating parameters of the arm, and over the full range of arm operating positions. The control system for one or more of the controlled axes includes several servo control loops utilizing force or pressure feedback from the axis actuators and variable inertia scaling of selected loop command signals and loop parameters. The variable inertia scaling in accordance with the inertia of the arm provides improved dynamic performance of the manipulator arm while maintaining stable servo-loop operation over a wide range of operating parameters. In a preferred arrangement, the variable inertia scaling is accomplished by the use of a look up table with appropriate interpolation of the table entries. The look up table is stored in a digital axis processor with the appropriate variable inertia scaling factors being determined by the axis processor for use by the respective axis servo-loop. The look up table in accordance with various predetermined operating requirements of the manipulator apparatus includes data entries representing inertia scaling factors according to the mass of the arm load, the commanded velocity in a particular axis, and the operating positions of one or more of the major control axes of the arm.

20 Claims, 6 Drawing Figures

CONTROL SYSTEM FOR MANIPULATOR APPARATUS

BACKGROUND OF THE INVENTION

A. Field of the Invention

The present invention relates to control systems for manipulator apparatus and more particularly to an improved control system for manipulator apparatus utilizing servo-loops that provide improved dynamic performance of the manipulator arm in a plurality of controlled axes by the use of variable inertia scaling and force feedback from the actuators of predetermined axes.

B. Description of the Prior Art

Various control systems for manipulator apparatus have been proposed and/or implemented utilizing servo-loops having command signals and feedback signals to position a manipulator arm controlled by a plurality of axes.

Control systems of this type, for example, are disclosed in U.S. Pat. Nos. 3,661,051; 4,086,522; 4,132,937; and application Ser. No. 154,439. The control system of U.S. Pat. No. 3,661,051 utilizes a servo-loop having position command signals and position feedback signals to control the manipulator arm. U.S. Pat. No. 4,086,522 utilizes position and velocity command signals, and position and velocity feedback in a servo control loop. U.S. Pat. No. 4,132,937 utilizes dynamic feedback including acceleration feedback and velocity feedback data that is combined with the position error signal to stabilize the control and operation of the manipulator arm by providing a high negative dynamic feedback signal during deceleration and a low signal during the acceleration phase to avoid conflict between the positional error signal and the dynamic feedback signal. Application Ser. No. 154,439 utilizes a servo-loop having position, velocity and acceleration command signals and position, velocity and acceleration feedback for control of the manipulator arm.

While the above prior art arrangements have, in general, been found satisfactory for their intended purpose, there is a continuing need in many manipulator applications for improved dynamic performance while maintaining servo-loop stability. Further, there is a need for improved dynamic performance of manipulator arm control where the manipulator arm experiences a wide variation in arm loads during performance of a work task.

Specifically, it has been found that control systems of the prior art are not optimized for the dynamic performance and load of the manipulator arm for the wide range of inertial loads that the manipulator arm experiences throughout its range of operating positions in the controllable axes. Thus in typical prior art control systems, servo-loop gains and loop parameters are dictated by stability requirements in accordance with the extremes of the inertial loads. Further it has been found that acceleration feedback is difficult if not nearly impossible to obtain for all controllable axes of a practical manipulator. Additionally, in many instances the acceleration feedback does not provide ideal feedback information as to the dynamic behavior of the manipulator arm. The control of the dynamic performance of the manipulator arm is further complicated by the change in working loads on the manipulator arm which varies from no load to full load for a given work task and which varies for various loads for different work tasks or during different steps in a work task.

SUMMARY OF THE INVENTION

It is therefore a primary object of the present invention to provide a new and improved control system for manipulator apparatus that results in improved dynamic performance and control of the manipulator arm in a plurality of controlled axes over the full range of manipulator arm operating parameters including the range of operating position of the various axes, the full range of arm loads, and the dynamic operating parameters of the arm.

It is another object of the present invention to provide a new and improved control system for manipulator apparatus that utilizes variable inertia scaling for various command signals and loop parameters and a servo-loop to provide improved dynamic performance of the manipulator arm over its full operating range, the variable inertia scaling being provided as a function of manipulator arm positions and/or load weights on the arm.

It is a further object of the present invention to provide a new and improved control system for manipulator apparatus having a servo-control loop including a high performance velocity control loop with velocity feedback, a position error loop that provides a follow-up or check on the primarily controlled velocity loop and a variable inertia scaled acceleration command signal with force actuator feedback to provide improved dynamic performance.

It is yet another object of the present invention to provide a new and improved control system for manipulator apparatus wherein a command signal to a servo-control loop for one of the control axes is variably scaled in accordance with and as a function of arm load, the magnitude of the velocity command and the arm position.

Briefly, these and other objects of the present invention are achieved by providing a control system for manipulator apparatus having an arm movable in a plurality of axes that results in improved dynamic performance and control of a manipulator arm over a wide range of arm loads, dynamic operating parameters of the arm, and over the full range of arm operating positions. The control system for one or more of the controlled axes includes servo control loops utilizing force or pressure feedback from the axis actuator and variable inertia scaling of selected loop command signals and loop parameters. The variable inertia scaling in accordance with the inertia of the arm provides improved dynamic performance of the manipulator arm while maintaining stable servo-loop operation over a wide range of operating parameters. In a preferred arrangement, the variable inertia scaling is accomplished by the use of a look up table with appropriate interpolation of the table entries. The look up table is stored in a digital axis processor with the appropriate variable inertia scaling factors being determined by the axis processor for use by the respective axis servo-loop. The look up table in accordance with various predetermined operating requirements of the manipulator apparatus includes data entries representing inertia scaling factors according to the mass of the arm load, the commanded velocity in a particular axis and operating positions of one or more of the major control axes of the arm.

The invention both as to its organization and method of operation together with further objects and advantages thereof will best be understood by reference to the following specification taken in connection with the accompanying drawings.

DETAILED DESCRIPTION OF THE PREFERRED EMBODIMENT

Figure 1:
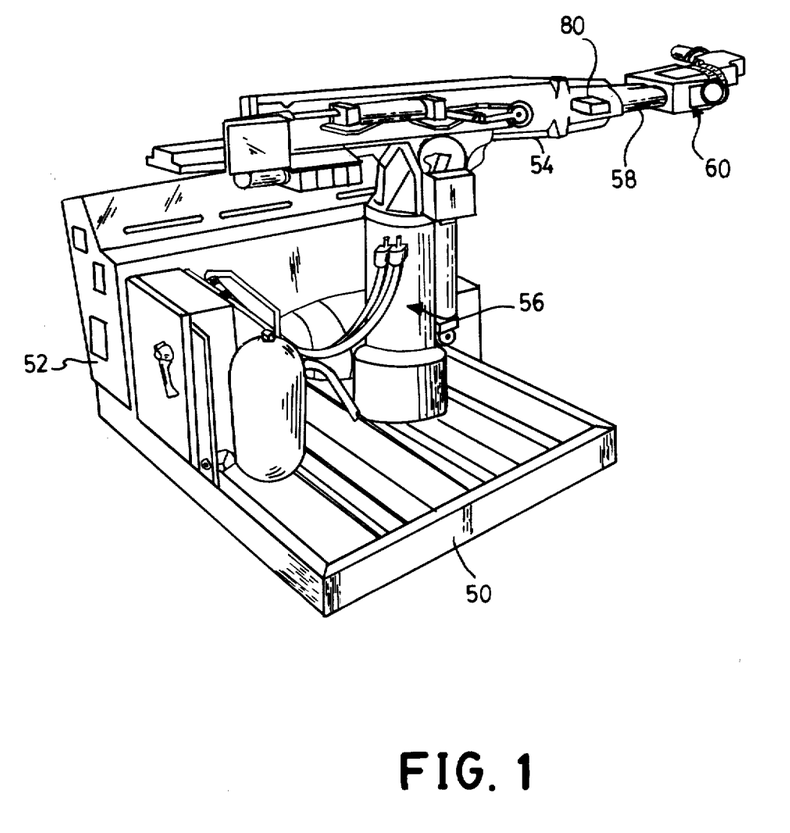
FIG. 1 is a perspective view of a programmable manipulator suitable for use in conjunction with the control system of the present invention.
Figure 2:
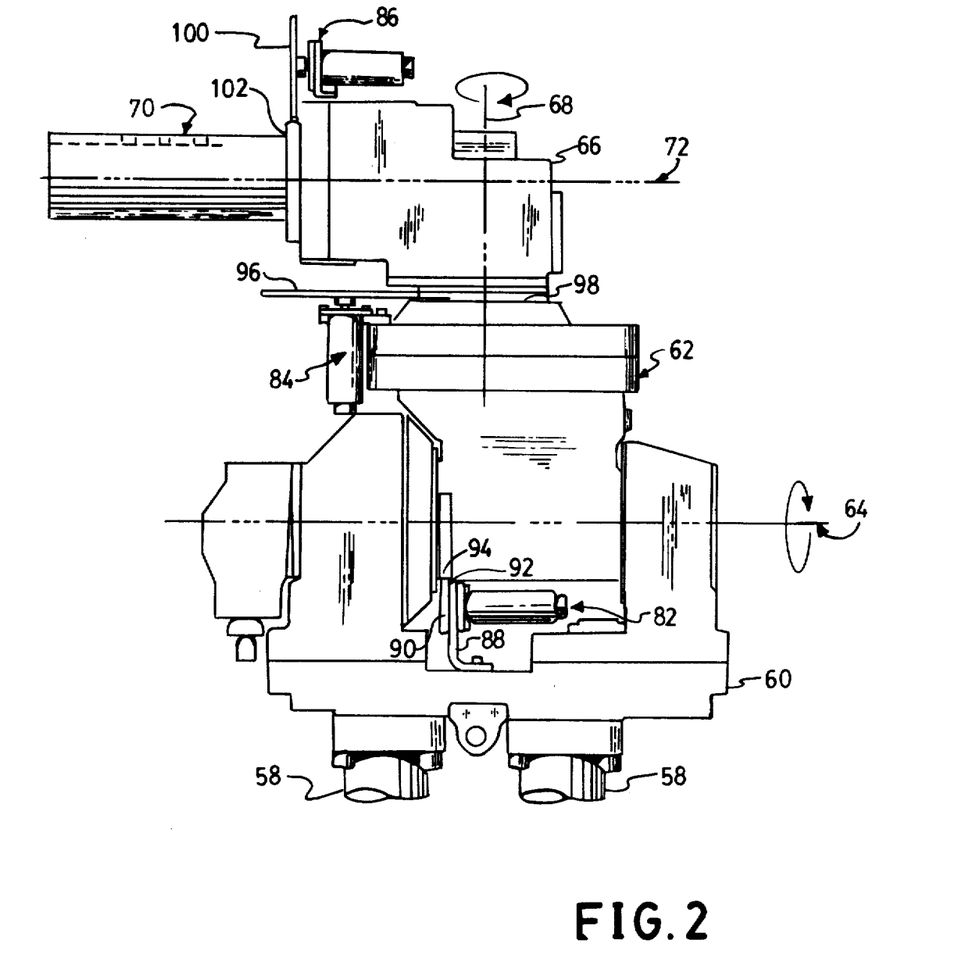
FIG. 2 is an enlarged plan view of the outer three axes and the manipulator hand of the manipulator apparatus of FIG. 1.

Referring now to FIGS. 1 and 2, a programmable manipulator apparatus suitable for use with the control system of the present invention is therein illustrated as comprising a generally rectangular base or platform 50 on which the manipulator arm is supported together with the hydraulic, electrical and electronic components necessary to provide the programmed articulations in the six degrees of freedom or axes of the manipulator arm.

Specifically, the base 50 supports a control cabinet indicated generally at 52 within which is housed the electronic control apparatus of the manipulator apparatus including the control system of the present invention. The hydraulically powered manipulator arm comprises a boom assembly indicated generally at 54 which is pivotally mounted for movement about a horizontal axis on a trunk portion 56 which is rotatably mounted on a vertically extending column the bottom portion of which is secured to the platform 50.

The boom assembly 54 is titled to give a down-up (Vertical axis) motion of the outer end of the manipulator arm and includes a pair of hollow extendable arm portions 58 which are arranged to be moved in and out of the boom assembly 54 and provide a radial extension or retraction articulation (Radial axis).

The arm portions are secured to a crosshead assembly 60 which carries a projecting hand portion 62. The hand portion 62 is rotatably mounted in the crosshead assembly 60 to be rotated about a Wrist Bend axis 64 which is in the same general direction as the down-up articulation of the arm. The hand 62 also includes a rotatable extending outer hand portion 66 which is arranged to rotate about a radial axis 68 to produce a wrist swivel (Yaw axis) movement or articulation of the hand. The outer hand portion 66 is provided with an implement accepting socket 70 which is arranged to be fitted with various manipulator hand implements or welding guns. The implement socket portion 70 extends in a direction perpendicular to the wrist swivel axis 68 and is mounted within the outer hand portion 66 to be rotated about an axis 72 to produce a hand swivel articulation (Swivel axis).

The entire boom assembly 54 is arranged to be rotated about the vertical axis of the trunk 56 to produce the sixth articulation or degree of freedom of the manipulator apparatus called the Rotary axis motion.

The various hydraulic and mechanical drive train arrangements to provide the aforementioned movement in the six axes are described in U.S. Pat. No. 3,661,061 to which reference may be made for a detailed description.

The movement in the six axes referred to as Rotary, Vertical, Radial, Wrist Bend, Yaw and hand Swivel movement, is controlled by the control system of the present invention as will be explained in more detail hereinafter in connection with FIGS. 3 through 6.

In order to provide digital information representing the absolute position of the arm and hand assembly in each of the six controlled axes of movement, there is provided a series of six digital encoders, 73 (Radial), 74 (Yaw), 75 (Vertical), 76 (Bend), 77 (Rotary) and 78 (Swivel) one for each controlled axis as described in more detail in the above referenced U.S. Pat. No. 3,661,051 and as represented in FIGS. 3 through 6.

To provide acceleration feedback in the vertical axis an accelerometer or other suitable dynamic sensing assembly 80 is mounted near the outer end of the manipulator boom assembly 54. The acceleration feedback in the vertical axis is selectively utilized in one embodiment of the control system of the present invention.

To provide velocity feedback in the Bend, Swivel and Yaw axes, LVT (linear velocity transducer) devices 82 (Bend) 84 (Yaw) and 86 (Swivel), not shown, are provided in the preferred embodiment to directly sense the velocity of the respective actuators of each axis. In an alternate embodiment, tachometers 82, 84 and 86 are arranged to sense rotation about the Bend, Yaw and Swivel axes respectively. The LVT devices are preferred since they are believed to be more reliable than tachometer sensing. The tachometers may be desirable in a situation where the actuators are not readily accessible for mounting of the LVT devices. FIG. 2 illustrates the alternate embodiment with the use of tachometers.

In the alternate embodiment, the wrist Bend axis tachometer 82 is carried by a mounting backet 88 attached to the crosshead assembly 60 and is provided with a rotary contact wheel 90 on the tachometer input shaft 92. The rotary contact wheel 90 is disposed in rotating contact with a circular contact portion 94 of the hand housing 62 to measure the wrist bend of the hand housing 62 about the wrist Bend axis 64 relative to the crosshead assembly 60. As the hand 62 rotates about the wrist Bend axis 64, the tachometer 82 generates an electrical signal whose voltage is proportional to the instantaneous velocity of the hand assembly 62.

Similarly, the wrist swivel Yaw axis tachometer 84 is carried by the hand 62 and includes a rotary contact wheel 96 disposed in rotary engagement with a circular contact portion 98 of the outer hand portion 66 which rotates with the outer hand. The wrist swivel Yaw axis tachometer 84 measures the velocity of the outer hand portion 66 about the Yaw axis 68 relative to the hand 62. Further, the tachometer 86, carried by the outer hand portion 66, includes a rotary contact wheel 100 in rotary engagement with a circular contact portion 102 of the implement socket 70 about the hand Swivel axis 72 relative to the outer hand portion 66. The longitudinal axis of each of the tachometers 82, 84 and 86 is parallel to the wrist Bend axis 64, the wrist swivel Yaw axis 68 and the hand Swivel axis 72 respectively.

Figure 3:
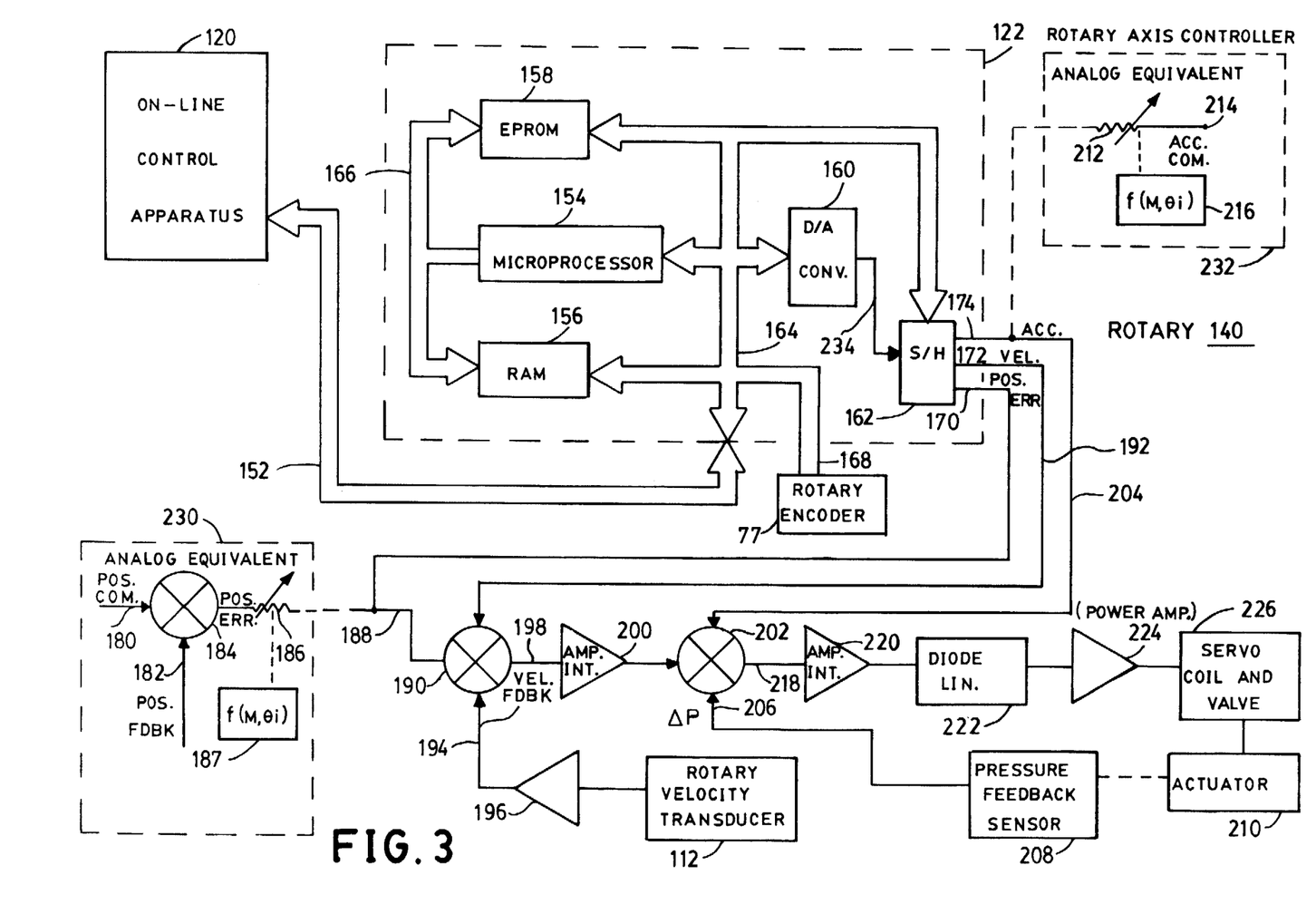
FIG. 3 is a block, schematic and logic diagram of the control system for the rotary axis of the manipulator in accordance with the present invention.
Figure 4:
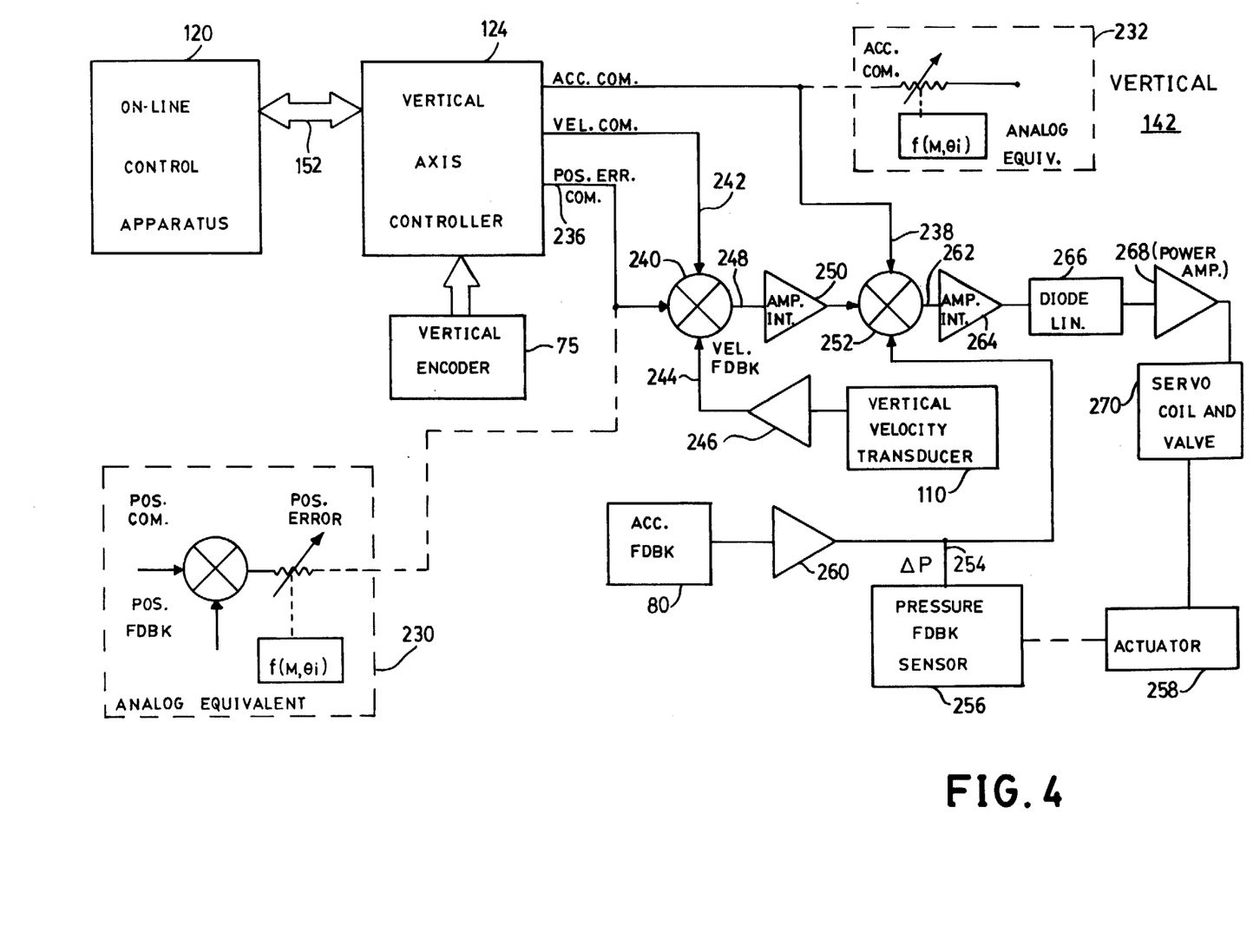
FIG. 4 is a block, schematic and logic diagram of the control system for the vertical axis of the manipulator of FIG. 1 of the present invention.
Figure 5:
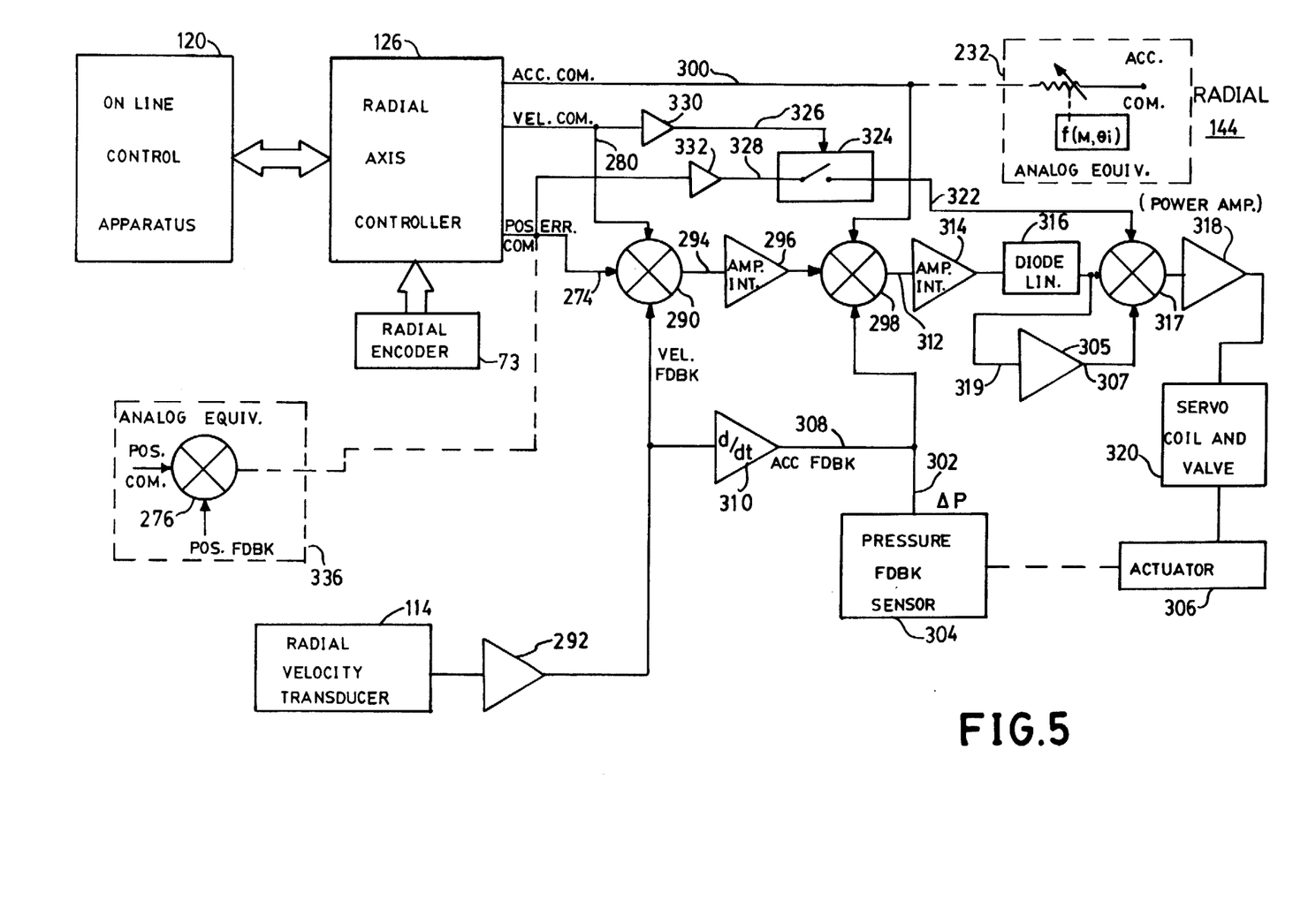
FIG. 5 is a block, schematic and logic diagram of the control system of the present invention for the radial axis of the manipulator of FIG. 1.

To provide velocity feedback information for the Vertical Rotary, and Radial axes, LVT devices or other suitable dynamic sensing devices 110, 112 and 114 represented in FIGS. 3 through 5 are provided to sense axis actuator movement or at other suitable locations in the drive trains of the various axes of the manipulator apparatus to sense motion in the Vertical, Rotary and Radial axes respectively.

Considering now the control system of the present invention and referring to FIGS. 3 through 6, in a preferred embodiment of the present invention the control system includes: on-line control apparatus 120; axis controller stages 122, 124, 126, 128, 130, 132 for each of the respective Rotary, Vertical, Radial, Bend, Yaw and Swivel axes; and the analog servo-loop circuitry 140, 142, 144, 146, 148 and 150 in the Rotary, Vertical, Radial, Bend, Yaw and Swivel axes respectively.

The on-line control apparatus 120 communicates with the respective axis controller stages 122 through 132 via a digital data bus 152. The on-line control apparatus 120 includes a memory (not shown) having stored therein data representing the positions in each of the controllable axes to which the manipulator is to be moved over a predetermined work program. The on-line control apparatus 120 also includes either electronic circuitry, or a computer or microprocessor (not shown) that utilizes the data stored in the memory for generating basic command signals to each of the axis controllers 122 through 132 via the data bus 152 including position and velocity command signals.

Each of the axis controllers 122 through 132 includes an axis microprocessor 154, a RAM (random access memory) stage 156, and an EPROM (electronically programmable read only memory) stage 158, a digital to analog converter stage 160 and a sample and hold output stage 162. The data input and output lines of the microprocessor 154, the RAM 156, the sample and hold stage 162, the EPROM stage 158 and the D to A converter 160 are interconnected by a data bus 164. Additionally, the microprocessor 154 includes an address output data bus 166 connected to address the EPROM 158 and the RAM 156. The rotary encoder 77 is also connected via output data lines 168 to the data bus 164 to provide appropriate digital feedback information.

The axis controller stages 122 through 132 are arranged to calculate and output analog position error, velocity and acceleration command signals at outputs 170, 172, 174 respectively of the sample and hold output stage 162 in response to the basic position and velocity command signals received from the on-line control apparatus 120 via the data bus 152. The initial calculations performed by the axis control stages 122 through 132 to calculate position, velocity and acceleration control signals is similar to the function performed by the on-line computation and control apparatus 18 of application Ser. No. 154,439 filed by W. Perzley et al on May 29, 1980 to which reference may be made for more detailed discussion of these computations. In an alternative arrangement, the analog servo-loops 140 through 150 are arranged to receive appropriate, analog position, velocity and acceleration command signals from the control apparatus as disclosed in application Ser. No. 154,439. Further, in other alternate arrangements, the analog servo-loops 140 through 150 including the analog equivalent circuit portions of these respective servo-loops may be operated from other suitable apparatus that supplies position, velocity and acceleration command signals with the analog servo-loops providing the variable inertia scaling factors to the various command signals and loop parameters of the present invention.

Thus the analog servo-control loops 140 through 150 in various embodiments may be provided with appropriate position, velocity and acceleration command signals from various control apparatus including either the type that provides on-line command signals generated from pre-computed off-line dynamic arm trajectory movement of the manipulator arm or the type that calculates on-line dynamic parameters and command signals strictly from position data that is recorded during the teach phase.

Considering now an alternate embodiment of the present invention and the analog servo-control loops 140 through 150 inclusive of the analog equivalent elements depicted in FIGS. 3 through 6, important aspects of the control system of the present invention will be described on an analog servo-loop basis independent of the rotary axis controller stages 122 through 132 of the preferred embodiment. Thus it should be understood that in alternate embodiments of the present invention, the control system is provided by analog servo-loop control circuitry as contrasted to the preferred embodiment where the axis controller stages 122 through 132 function in combination with the analog servo-loop control circuitry without the denoted analog equivalent circuitry in a hybrid digital-analog control system.

Specifically, and considering now the rotary analog servo-loop 140 of FIG. 3, a summer stage 184 combines an analog position command signal 180 with a position feedback signal 182 derived from the rotary encoder 77. The output of the summer stage 184 provides a position error signal that is coupled through a variable resistance stage 186 to provide a position error command analog signal 188 to one input of a summer stage 190. The variable resistance stage 186 is controlled by a scaling stage 187 that varies the resistance of stage 186 as a function of arm load mass and arm position. The summer stage 190 also includes as two additional inputs the analog velocity command signal 192 and a velocity feedback signal 194 as derived from the rotary velocity transducer stage 112 through an amplifier 196. The combined output 198 of the summer 190 is connected through an amplifier/integrator stage 200 to one input of a summer stage 202. The summer stage 202 includes as two additional inputs the analog acceleration command signal 204 and a $\Delta$ P pressure feedback signal 206.

The $\Delta$ P pressure feedback signal 206 is a differential pressure signal obtained by a pressure feedback sensor 208 that directly measures the differential pressure across the double acting actuator 210 at the manifold of the actuator.

The acceleration command signal 204 is connected to the output of a variable resistance stage 212. The input of the variable resistance stage 212 is connected to an acceleration command signal 214. The variable resistance stage 212 similarly to the stage 186 represents various embodiments wherein either a variable resistance device or a variable gain device operates to variably scale the acceleration command input under the control of variable scaling stage 216. The variable scaling stage 216 similar to the stage 187 modifies the acceleration command input signal 214 in accordance with the inertial load on the arm as determined in a specific embodiment by the load weight on the arm and the position of the arm as explained in more detail hereinafter. By way of example, the variable resistance stage 212 is varied by stage 216 in accordance with the working load attached to the arm and in accordance with the encoder position reading of the radial axis as derived from the radial axis encoder 73. In other specific embodiments where it is deemed desirable, the inertial scaling stage 216 also varies the acceleration command signal 214 in accordance with the vertical axis arm position as derived from the vertical axis encoder 75.

The output 218 of the summer 202 is connected through an amplifier/integrator stage 220 and a diode linearizer circuit 222 to a power amplifier circuit 224. The power amplifier circuit 224 drives the servo-coil of the rotary axis servo-coil and valve arrangement 226. The servo-coil and valve arrangement 226 drives the actuator 210 to appropriately position the manipulator arm in the rotary axis.

In accordance with important aspects of the present invention, the variable inertia scaling of the acceleration command signal 214 to provide the command signal 204 as well as the variable inertia scaling of the position loop at 188 provides improved dynamic performance over the operating range of the manipulator arm including both arm position and arm load. By means of the variable inertia scaling, loop gains are maximized in accordance with stable loop operation over the inertial range encountered by the manipulator arm. In servo-loop control systems wherein variable inertial scaling of the present invention is not provided, the variation in inertia of the manipulator arm throughout the operating range of work loads and arm positions results in a wide range of loop gains for stable operation. Thus typical servo-loops are required to be designed in accordance with stable operation at the loop gains inherent for stable operation for the worst case, minimum inertial loads encountered by the manipulator arm. Of course, this results in a degradation of dynamic performance as opposed to variable inertial scaling arrangements as provided by the control system of the present invention as exemplified by the rotary servo-loop arrangement 140 of FIG. 3 including the analog embodiment as shown by the analog equivalents.

The use of pressure feedback has been found desirable as accurately representating the inertial mass system of the manipulator arm and in combination with the variable inertia scaling provides a torque or force loop that results in improved dynamic performance of the control system of the present invention. Thus the use of pressure feedback in combination with the variable inertia scaling provides improved dynamic performance over systems utilizing acceleration feedback which is difficult and in some situations fairly impossible to accurately obtain on practical manipulator arm structures. The use of the inertia scaled acceleration or force loop in the servo-control for a manipulator arm is advantageous to provide a fast loop response to changing dynamic conditions of the manipulator arm.

Considering now the preferred embodiment of the present invention wherein the rotary servo-loop 140 operates in conjunction with and receives acceleration, velocity and position error command signals from the rotary axis controller 122 in a digital-analog, servo-loop arrangement, the rotary axis controller 122 provides the position error command signal 188, the velocity command signal 192 and the acceleration command signal 204.

The rotary axis controller 122 provides the variable inertia scaling function in a digital format similar to the analog equivalent stages 230 and 232 for the variable inertia scaling of the position error command 188 and the acceleration command 204. The on-line control apparatus 120 provides basic command functions including in a specific embodiment, position and velocity commands to the rotary axis controller 122 over the data bus 152 that define the basic performance and arm trajectory during a particular proposed work motion of the manipulator arm in the rotary axis.

In response to the basic velocity command signal information on the bus 152, the rotary axis controller 122 provides detailed position, velocity and acceleration command signal data by calculations performed under the control of the microprocessor 154 and the program stored in the EPROM stage 158. The position error, velocity and acceleration command signals are converted to an analog format by the D/A converter stage 160 and presented in an appropriate time multiplex sequence at 234 to a sample and hold stage 162. The sample and hold stage 162 is controlled to provide the position error command 188, the velocity command 192 and the acceleration command 204 under control of the data bus 164 and updated accordingly. The rotary encoder 77 provides digital encoder information at 168 in accordance with the absolute position of the rotary axis to the microprocessor 154 for use in calculating the position error command 188 in combination with the basic position command signals from the on-line control apparatus 120.

Further the rotary axis controller 122 provides the inertia scaling of the acceleration command signal 204 and the position error command signal 188 by means of a look-up table and appropriate interpolation within the look-up table. The lookup table in various specific embodiments, intended by way of example only, includes various formats to scale the command signals in accordance with various inertial parameters. By way of example, Tables I, II and III are representative of appropriate look up tables that in specific embodiments may be utilized in the practice of the present invention.

Referring to Table I, the look-up table defines the inertial scaling factors K1 through K12 as a function of the manipulator arm positioned in the Radial axis at six radial positions R1 through R6 which may also be defined as radial position ranges. Further, the inertial scaling factors are also classified in the look-up table as a function of a given manipulator arm load weight M being either on or off the arm at a particular point in the work program. The rotary axis controller 122 receives the radial axis position information defining R1 through R6 from the on-line control apparatus 120 via the data bus 152. The on-line control apparatus 120 also receives encoder information over the data bus 152 from the radial axis controller 126 as well as the vertical axis controller 124, the bend axis controller 128, the yaw controller 130 and the swivel axis controller 132. Further the on-line control apparatus 120 also provides information to the rotary axis controller 122 concerning the status of the load being on or off the arm at a particular point in the work program as determined in a teach phase with entered data.

The look-up Table I may be stored either in the EPROM stage 158 or in the RAM stage 156. The advantage of storing the look-up table in the RAM 156 is the interchange ability of the axis controllers 122 through 130 that is achieved by individually down-loading the particular look-up table for each axis into the respective axis controller from the on-line control apparatus 120 upon the initial start up of the manipulator apparatus and the on-line control apparatus 120. In this manner the individualized look-up tables are loaded into the RAM stage 156 for use during operation. Further, flexibility is also provided in that the look-up tables are capable of being easily altered by the on-line control apparatus 120 for various applications.

In any case, the microprocessor 154 for controlling the issuing of the position velocity and acceleration command signals under the control of the program in the EPROM stage 158 enters the look-up table in the RAM 156 with the appropriate entry data being supplied from the on-line control apparatus 120 over the data bus 152. Thus for example if the RAM stage 156 includes stored therein the Table I, the on-line control apparatus 120 provides the rotary axis controller 122 at a particular point in the program with data representing whether the load M is on or off the manipulator arm and the position of the manipulator arm in the Radial axis. With this entry data, for example, the Radial axis being at R3 and the load on, the inertial scaling factor K9 is selected by the microprocessor 154 and the acceleration command 204 and the position error command 188 are appropriately scaled by this factor. Of course it should also be understood that various appropriate fixed scaling factors for various loop functions are also provided either in the axis controllers 122 through 130 or by the analog servo-loops 140 through 150.

Further, the microprocessor 154 under the control of the program in the EPROM 158 stage may also provide interpolation within the look-up Table I such that a value of radial position such as $R_x$ between two radial table entry values R2 and R3 is utilized to interpolate with a load on case between the scaling factors K8 and K9 with appropriate linear interpolation based on the value Rx between R2 and R3.

Of course it should be understood that Table I is merely exemplary of one look-up table by which the rotary axis controller 122 obtains appropriate inertial scaling factors for the rotary axis servo-loop 140. For example Tables II and III provide other arrangements for look-up tables to obtain appropriate scaling factors. Further, the microprocessor 154 in one specific embodiment could directly calculate scale factors in accordance with the program without the use of a look-up table and operate directly from an inertial scaling equation utilizing the load weight and the radial position as variables.

Considering Table II the look-up table depicted therein utilizes entry by the radial axis position in six ranges or values and further includes table entry according to various load weights on the manipulator arm to provide increased flexibility for programs operating with different load weights either during the program work task or for various work tasks. For example if the radial axis at a particular point in a program step is R4 and the load weight is M2, the inertial scaling factor K22 is selected by the microprocessor 154 and applied to appropriately scale the acceleration command signal 204 and the position error command signal 188.

Further considering Table III for various manipulator arm apparatus and work applications, it may be desirable to select a scale factor from the look-up Table III in accordance with Radial axis position and with vertical axis position for one or more load weights. For example, Table III allows entry by the vertical axis and the radial axis position to select an appropriate scaling factor for a given load weight M1. Of course, additional tables may be provided for different load weights. Further interpolation within the table and/or scaling in accordance with the load weight may also be provided.

TABLE I

| INERTIAL SCALING FACTORS | | |
|---|---|---|
| LOAD M ON | LOAD M OFF | RADIAL AXIS |
| K7 | K1 | $R_1$ |
| K8 | K2 | $R_2$ |
| K9 | K3 | $R_3$ |
| K10 | K4 | $R_4$ |
| K11 | K5 | $R_5$ |
| K12 | K6 | $R_6$ |

TABLE II

| INERTIAL SCALING FACTORS | | | | | |
|---|---|---|---|---|---|
| | | LOAD WEIGHT | | | |
| O | M1 | M2 | M3 | M4 | RADIAL AXIS |
| K1 | K13 | K19 | K25 | K31 | $R_1$ |
| K2 | K14 | K20 | K26 | K32 | $R_2$ |
| K3 | K15 | K21 | K27 | K33 | $R_3$ |
| K4 | K16 | K22 | K28 | K34 | $R_4$ |
| K5 | K17 | K23 | K29 | K35 | $R_5$ |
| K6 | K18 | K24 | K30 | K36 | $R_6$ |

TABLE III

| INERTIAL SCALING FACTORS (LOAD M1) | | | | | | |
|---|---|---|---|---|---|---|
| | | | VERTICAL AXIS | | | |
| V1 | V2 | V3 | V4 | V5 | V6 | RADIAL AXIS |
| K37 | K43 | K49 | K55 | K61 | K67 | $R_1$ |
| K38 | K44 | K50 | K56 | K62 | K68 | $R_2$ |
| K39 | K45 | K51 | K57 | K63 | K69 | $R_3$ |
| K40 | K46 | K52 | K58 | K64 | K70 | $R_4$ |
| K41 | K47 | K53 | K59 | K65 | K71 | $R_5$ |
| K42 | K48 | K54 | K60 | K66 | K72 | $R_6$ |

Thus from the foregoing it can be seen that appropriate inertial scaling factors can be provided either by the rotary access controller 122 in a digital format with look-up tables or the like or by an analog servo-loop with the analog equivalent circuits 230 and 232.

Considering now the vertical control system of the present invention and referring now to FIG. 4, the vertical servo-loop 142 includes the analog circuit elements 230 and 232 similarly to those provided in the rotary servo-loop 140 with the analog position circuit 230 providing a position error command 236 and the circuit 232 providing an acceleration command signal 238.

The position error command signal 236 is connected to one input of a summer stage 240. The summer stage 240 also includes as inputs the vertical axis velocity command signal 242 and a velocity feedback signal 244. The velocity feedback signal 244 is derived from the vertical velocity transducer 110 through an amplifier 246. The output 248 of the summer stage 240 is connected through an amplifier/integrator stage 250 to one input of a summer stage 252. Acceleration command signal 238 is connected to a second input of a summer stage 252. A third input of the summer stage 252 is connected to a differential pressure feedback signal 254 obtained by a pressure feedback sensor 256 that senses differential pressure across the vertical axis actuator 258. Additionally, the accelerometer feedback sensor 80 is connected through an amplifier 260 as an input to the summer 252. Acceleration feedback is provided for additional servo-loop control capabilities. The accurate sensing of acceleration in the vertical axis is more readily and accurately obtained than is acceleration feedback in the rotary axis. Thus the acceleration feedback in the vertical axis provides additional dynamic information to the servo-loop 142 in addition to the pressure feedback at 254.

The output 262 of the summer stage 252 is connected through an amplifier/integrator stage 264 and a diode linearizing stage 266 to a power amplifier 268. The power amplifier 268 drives the vertical servo-coil and valve arrangement 270. The servo-coil and valve arrangement 270 controls positioning of the vertical actuator 258. Operation of the vertical axis servo-loop 142 is similar to that of the rotary axis servo-loop 140 discussed hereinbefore. Further the vertical axis controller 124 operates in a similar manner to that of the rotary axis controller 122. The vertical axis controller 124 obtains position feedback information from the vertical encoder 75.

As discussed hereinbefore, the vertical axis controller 124 supplies acceleration command signal 238 with appropriate variable inertia scaling, the velocity command 242 and the position error command 236 with variable inertial scaling. The inertial scaling factors presented by the vertical axis controller 124 are derived in a similar manner to that of the rotary axis controller 122.

Considering now the radial axis servo-loop 144, the analog circuitry with inertial scaling stage 232 similar to the vertical and rotary axes is also provided in the analog servo-loop 144. The position error command 274 in the analog circuit of the servo-loop 144 is provided from a summer stage 276 that combines a position command signal and a position feedback signal.

While the position error signals 74, 170, 236, and 340 of the various servo loops are referred to as a position error command signal, it should be understood that these signals are not strictly command signals since they represent the difference between position command signals and position feedback signals.

The position error command signal 274 and the velocity signal command 280 are connected as inputs to a summer stage 290. The summer stage 290 also includes a velocity feedback signal provided by the radial velocity transducer stage 114 through an amplifier 292. The output 294 of the summer stage 290 is connected through an amplifier/integrator stage 296 to one input of a summer stage 298. The summer stage 298 also includes an acceleration command 300 from the analog stage 232 as an input. The summer stage 298 also receives a pressure feedback signal 302 as an input derived from a pressure feedback sensor 304 that measures the differential pressure across a radial axis actuator 306 as discussed hereinbefore. The summer stage 298 also receives an acceleration feedback signal 308 derived from the velocity feedback signal from amplifier 292 by a differentiator stage 310. The output 312 of the summer stage 298 is connected through an amplifier/integrator stage 314 to a diode linearizer stage 316. The output 319 of the diode linearizer stage 316 is connected to one input of a summer stage 317. The output of the summer stage 317 is connected to drive a power amplifier 318.

The power amplifier stage 318 controls the radial axis servo-coil and valve arrangement 320. The servo-coil and valve arrangement 320 controls operation of the radial axis actuator 306.

The radial servo loop 144 also includes a shunt signal 322 which is connected to a second input of the summer stage 317. The shunt signal 322 is derived from a FET type switch stage 324. The switch stage 324 is actuated by the output 326 of a comparator stage 330. The input to the comparator stage 330 is connected to the analog velocity command signal 280. The signal input 328 of the switch stage 324 is provided at the output of an amplifier 332 having an input connected to the position error command signal 274. The comparator stage 330 turns on the switch stage 324 whenever the velocity command signal 280 is below a predetermined level, for example within a few millivolts of zero. When the switch stage 324 is turned on, the amplified position error command signal 328 provided by the amplifier 332 is connected through the switch stage 324 to the summer stage 317 at 322. The shunt signal 322 applies the amplified position error signal through the summer stage 317 directly to the power amplifier 318 when the velocity command signal 280 is approximately zero, occuring at the beginning and end of any programmed step move. Thus, when a move is completed, an instantaneous amplified position error signal of proper polarity is available to drive the power amplifier 318 resulting in radial axis positioning at or near coincidence with the position command. The shunt signal 322 effectively bypasses the intrinsic delays within the velocity and pressure loops, thereby improving the accuracy of position coincidence for the radial axis.

The radial servo loop 144 further includes a threshold compensating signal as a third input 307 to the summer stage 317. The signal 307 is derived through a comparator 305 having an input connected to the output 319 of the diode linearizer stage 316. The signal 307 to the summer stage 317 provides a positive offset current whenever the error signal 319 is greater than zero and a negative offset current whenever the error signal is less than zero. The signal 307 serves to instantaneously move the servo valve 320 through a nonconducting dead-band region thereby providing continuity of control. A similar threshold compensation circuit providing a signal 307 is preferably included in all other axes although not shown in FIGS. 3, 4 and 6.

Considering the preferred embodiment of the radial servo-loop 144 without the analog circuits 232 and 336, the radial axis controller 126 provides the variable inertia scaled acceleration command signal 300, the velocity command signal 280 and the position error command signal 274 to the remaining portions of the analog servo-loop 144. Operation of the radial axis controller 126 is similar to that described hereinbefore in connection with the axis controller stage 122 and 124.

Figure 6:
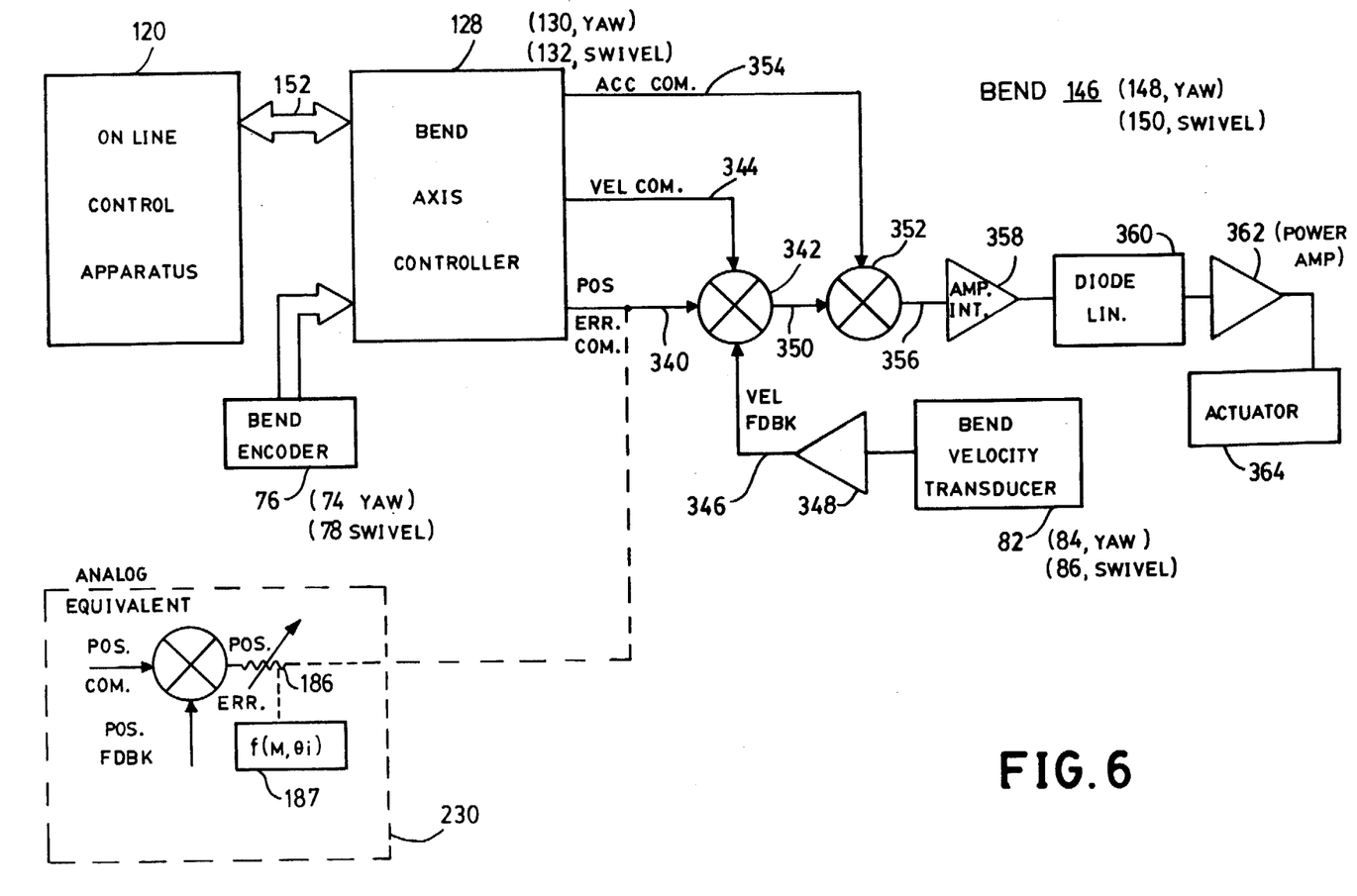
FIG. 6 is a block, schematic and logic diagram representing various aspects of the control system of the present invention provided for each of the outer three axes of the manipulator of FIGS. 1 and 2.

Considering now the control system of the present invention for the Bend Yaw and Swivel axes and referring to FIG. 6, the bend servo-loop 146 is depicted with various designations of the yaw and swivel and control system indicated in parenthesis adjoining the corresponding elements of the bend axis servo-loop 146. Since the outer three axes of the manipulator arm, namely the Bend Yaw and Swivel axes are not subjected to the large degree of inertial variations experienced by the Radial, Rotary and Vertical axes of the manipulator arm, pressure and acceleration feedback are not necessary for stable loop control and appropriate dynamic performance of these axes. Further, variable inertial scaling of the acceleration command signal is also not utilized.

Considering the alternate embodiments of an analog servo-loop for the bend servo-loop 146, the position error command signal 340 is provided by the analog position loop circuit 230 with variable inertial scaling of the position error. However, the variable position inertial scaling is not provided for the yaw and swivel axis and for those axis the variable resistance stage 186 and scaling stage 187 are not provided therein.

The position error command signal 340 is connected as an input to a summer stage 342 along with a bend axis velocity command signal 344 and a velocity feedback signal 346. The velocity feedback signal 346 is provided by an amplifier 348 connected to the output of the bend velocity transducer stage 82. The output 350 of the summer stage 342 is connected to one input of a summer stage 352. A bend axis acceleration command signal 354 is connected to a second input of the summer stage 352. The output 356 of the summer stage 352 is connected through an amplifier/integrator stage 358 and a diode linearizer circuit 360 to a power amplifier stage 362. The power amplifier stage 362 drives the bend axis actuator arrangement 364 to position the manipulator arm in the bend axis. Turning now to the preferred embodiment without the position loop analog stage 230, the bend axis controller stage 128 provides the acceleration command signal 354, the velocity command signal 344 and the position error command signal 340 to the analog servo-loop 146. The bend axis controller stage 128 receives bend axis position encoder information from the encoder stage 76. Operation of the bend axis controller 128 as well as the yaw and swivel controllers 130 and 132 respectively are substantially as described hereinbefore in connection with the rotary axis controller stage 122.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A control system for a manipulator having an arm movable in a plurality of axes and including control apparatus that provides position error, velocity and acceleration command signals in response to program data and arm position data, said manipulator arm performing a work cycle in accordance with said program data and said position error, velocity and acceleration command signals, said control system comprising:
   means for inertia scaling one or more of said position error and acceleration command signals in accordance with scale factors representing the variation of the inertia of said arm over said work cycle;
   means responsive to said inertia scaled command signals and said command signals not scaled for variations in inertia for generating axes control signals; and
   means responsive to said axes control signals for moving said arm in said plurality of axes.

2. The control system of claim 1 wherein said scaling means is responsive to the work load on said arm.

3. The control systems of claim 2 wherein said program data includes arm load data representing the work load on said arm throughout said work cycle.

4. The control system of claim 3 wherein said arm load data includes the load state defining whether a load is on or off said arm and data representing the mass of said load on said arm.

5. The control system of claim 1 wherein said scaling means is responsive to the position of said arm in one or more of said plurality of axes.

6. The control system of claims 2, 3 or 4 wherein said scaling means includes look-up table means for determining said scale factor in accordance with the inertia of said arm.

7. The control system of claim 6 wherein said look-up table includes a plurality of scale factors determined by the work load on said arm and the position of said arm in one or more of said plurality of axes.

8. The control system of claim 1 further comprising means for developing feedback signals representing the position and velocity of said arm and the force on said arm in one or more of said plurality of axes.

9. The control system of claim 8 wherein said axes control signal generating means comprises servo loop control means responsive to said feedback signals and said scaled command signals and said command signals not scaled for variations in inertia.

10. The control system of claim 9 wherein said arm moving means comprises hydraulically controlled actuators for one or more of said plurality of axes, said feedback developing means comprising means for sensing the pressure on one or more of said actuators.

11. The control system of claim 10 wherein one or more of said actuators are double acting actuators and said pressure sensing means comprising means for sensing the differential pressure across one or more of said double acting actuators.

12. A method for controlling the movement of a movable member comprising the steps of:
   generating command signals representing the desired movement of said member;
   scaling one or more of said generated command signals in accordance with scale factors representing the variation in inertia of said member over the various controlled movements of said members; and
   moving said member in accordance with said scaled command signals and said command signals not scaled for variations in inertia.

13. The method of claim 12 wherein said moving step is further accomplished in accordance with feedback signals representing the dynamic movement of said member.

14. The method of claim 13 wherein said dynamic movement of said member includes the force experienced by said member.

15. A control system for a manipulator having an arm movable in a plurality of axes and including control apparatus that provides position error, velocity and acceleration command signals in response to program data and arm position data, said manipulator arm performing a work cycle in accordance with said program data and said position error, velocity and acceleration command signals, said control system comprising:
   means for inertia scaling one or more of said position error and acceleration command signals in accordance with scale factors representing the variation of the inertia of said arm over said work cycle;
   means responsive to said inertia scaled command signals and said command signals not scaled for variations in inertia for generating axes control signals;

means responsive to said axes control signals for moving said arm in said plurality of axes; and means for developing feedback signals representing the position and velocity of said arm and the force on said arm in one or more of said plurality of axes, said axes control signal generating means comprising servo loop control means responsive to said feedback signals and said scaled command signals and said command signals not scaled for variations in inertia, said arm moving means comprising an electrically controlled hydraulic valve for one or more of said axes, each of said hydraulic valves having an overlapping center range of valve movement in which the valve does not provide control output characteristics, said servo loop control means further comprising valve threshold offset actuating means for developing an offset actuating signal of appropriate polarity to said valve independent of said respective axis control signal and in response to the respective axis control signal being less than or greater than zero for said axis controlled by said valve.

16. A control system for a manipulator having an arm movable in a plurality of axes and including control apparatus that provides position error, velocity and acceleration command signals in response to program data and arm position data, said manipulator arm performing a work cycle in accordance with said program data and said position error, velocity and acceleration command signals, said control system comprising:

means for inertia scaling one or more of said position error and acceleration command signals in accordance with scale factors representing the variation of the inertia of said arm over said work cycle;

means responsive to said inertia scaled command signals and said command signals not scaled for variations in inertia for generating axes control signals;

means responsive to said axes control signals for moving said arm in said plurality of axes; and means for developing feedback signals representing the position and velocity of said arm and the force on said arm in one or more of said plurality of axes, said axes control signal generating means comprising servo loop control means responsive to said feedback signals and said scaled command signals and said command signals not scaled for variations in inertia, said servo loop control means for at least one of said axes further comprising shunt control means responsive to said respective axis velocity command signal and said respective axis position error command signal for providing a shunt signal directly to said arm moving means independent of said respective axis command signal and in addition to said axis control signal for said respective axis, said shunt control means being active to provide said shunt signal whenever said velocity command signal is below a predetermined level, said shunt control means including means for amplifying said position error command signal to provide said shunt signal.

17. A method for controlling a manipulator arm movable in a plurality of axes comprising the steps of:

generating acceleration/torque command signals for one or more of said axes in response to stored program data representing a taught work cycle;

modifying said generated acceleration/torque command signals in one or more of said axes in accordance with the changes in the effective inertia of said manipulator arm in one or more of said axes as the inertia of said manipulator arm varies during said work cycle in one or more of said axes; and controlling the movement of said manipulator arm in one or more of said axes in accordance with said modified acceleration/torque command signals and dynamic feedback signals representing the inertial mass system of said manipulator arm to provide the desired torque to said manipulator arm in one or more of said axes in accordance with said effective inertia of said manipulator arm throughout said work cycle.

18. The method of claim 17 wherein said manipulator arm includes hudraulically controlled actuators for said one or more of said axes, said controlling step further comprising the step of providing a sensed pressure signal representing the pressure on said one or more controlled actuators as said dynamic feedback signals.

19. A control system for a manipulator having an arm movable in a plurality of axes, said control system comprising:

means for generating acceleration/torque command signals for one or more of said axes in response to stored program data representing a taught work cycle;

means for defining the effective inertia throughout said work cycle of said manipulator arm in one or more of said axes as said arm moves to perform said work cycle;

means responsive to said inertia defining means and said acceleration/torque command signal generating means for modifying said acceleration/torque command signals in accordance with the changes in effective inertia of said manipulator arm during said work cycle;

means for providing dynamic feedback signals for one or more of said axes representing the inertial mass system of said manipulator arm; and servo loop control means responsive to said dynamic feedback signals and said modified acceleration/torque command signals for controlling movement of said manipulator arm in one or more of said axes to provide the desired torque to said manipulator arm in one or moe of said axes in accordance with said effective inertia of said manipulator arm throughout said work cycle.

20. The control system of claim 19 wherein said manipulator arm comprises a hydraulic actuator for one or more of said axes and said dynamic feedback signal providing means comprises means for sensing the pressure on said one or more controlled actuators.

* * * * *